F. S. HEBDEN.
SCALE.
APPLICATION FILED JAN. 2, 1912.
1,073,072.
Patented Sept. 9, 1913.
3 SHEETS—SHEET 1.
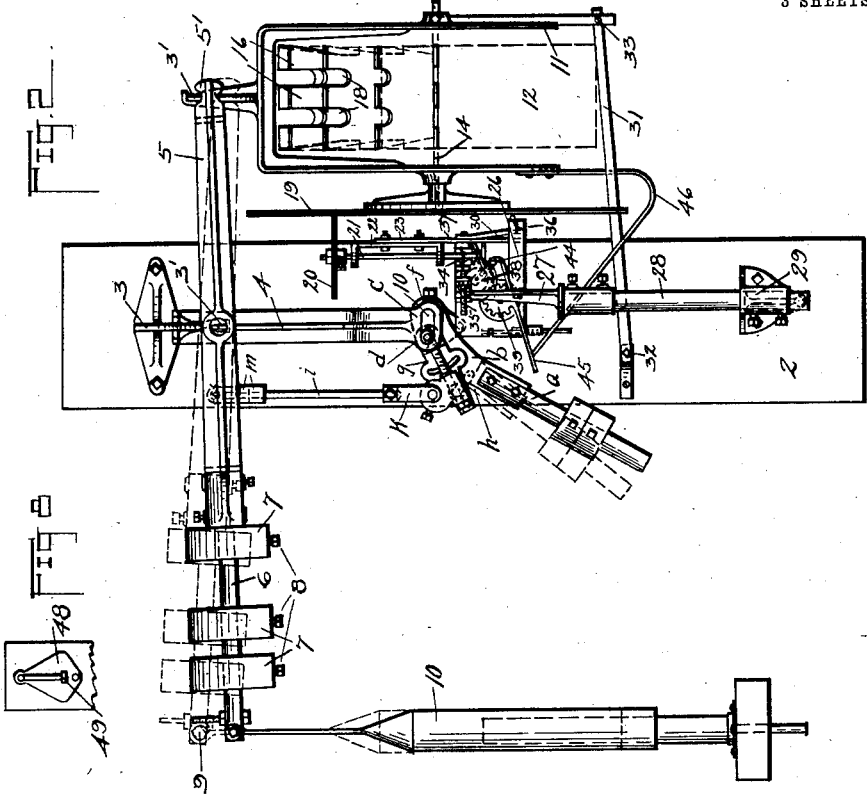

F. S. HEBDEN.
SCALE.
APPLICATION FILED JAN. 2, 1912.
1,073,072.
Patented Sept. 9, 1913.
3 SHEETS—SHEET 2.
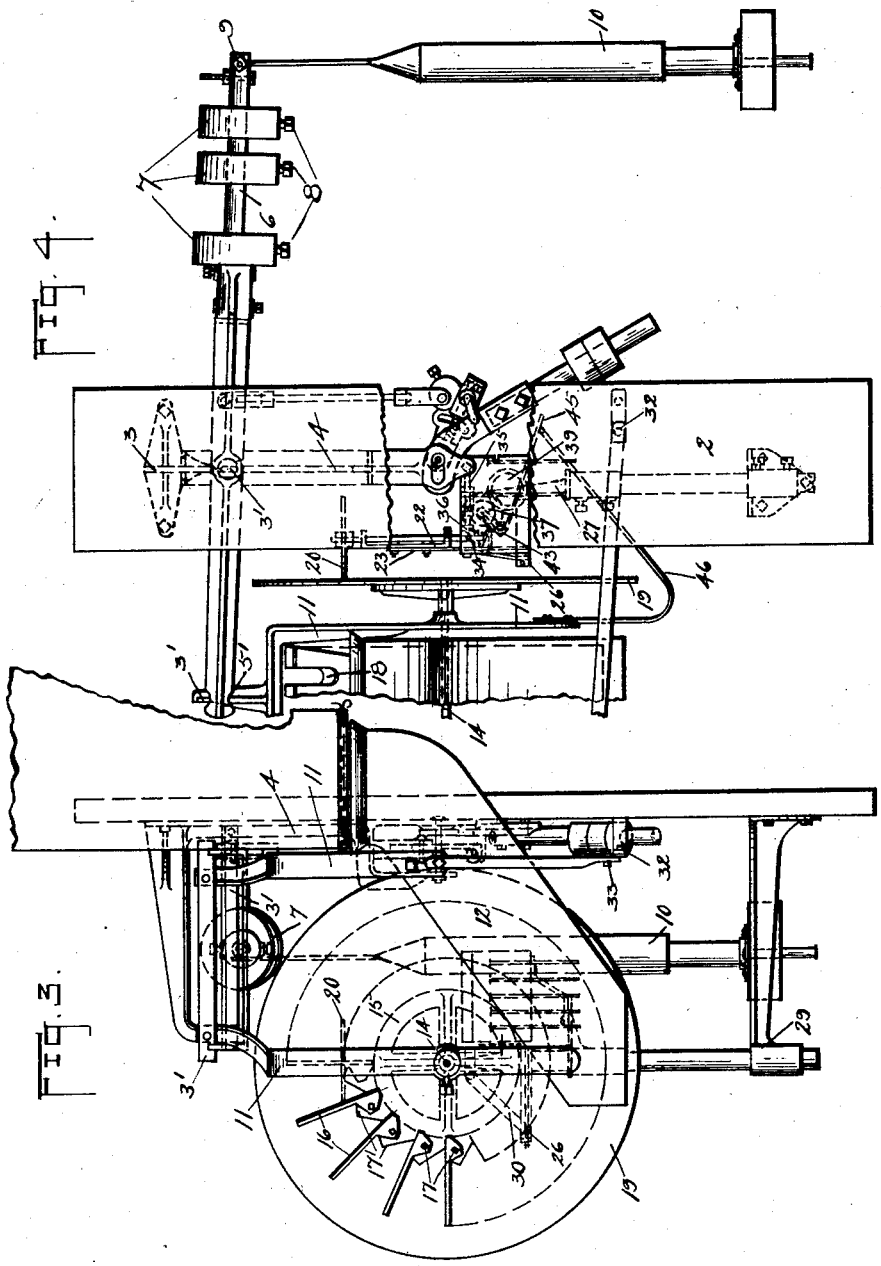
WITNESSES
INVENTOR F. S. HEBDEN.
SCALE.
APPLICATION FILED JAN. 2, 1912.
1,073,072.
Patented Sept. 9, 1913.
3 SHEETS—SHEET 3.
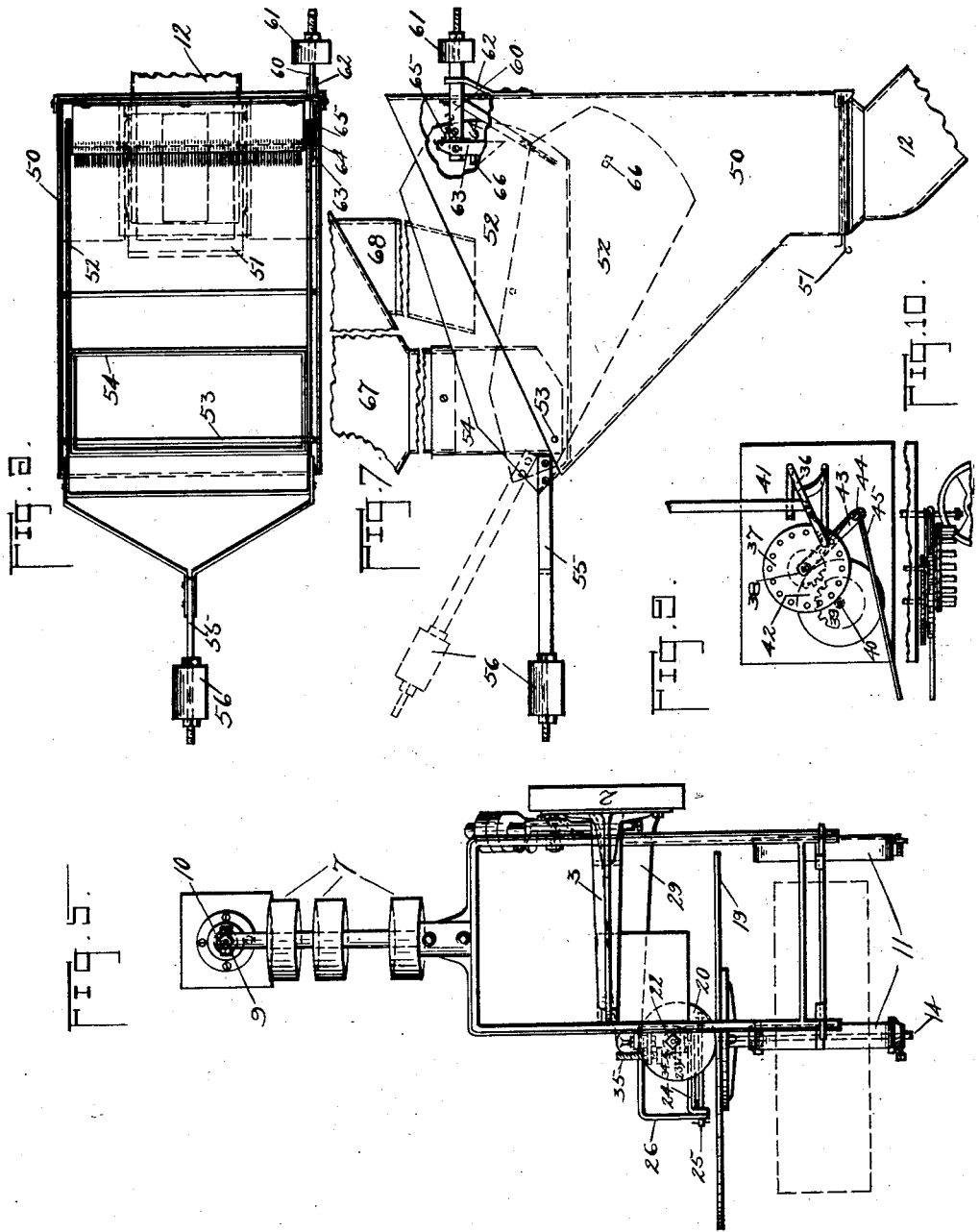

UNITED STATES PATENT OFFICE.

FRANK S. HEBDEN, OF PEORIA, ILLINOIS.

SCALE.

1,073,072.  Specification of Letters Patent.  Patented Sept. 9, 1913.

Application filed January 2, 1912. Serial No. 669,046.

*To all whom it may concern:*

Be it known that I, FRANK S. HEBDEN, a citizen of the United States, residing at Peoria, in the county of Peoria and State of Illinois, have invented certain new and useful Improvements in Scales, of which the following is a specification.

My invention relates to scales or weighing devices adapted to weigh grain and other substances while flowing in a continuous stream.

More particularly my invention relates to balancing means for a trough associated with means driven by a flowing stream of grain or other substance passing through the trough, comprising parts associated relatively to impart speed or distance traveled to a meter where the same is recorded.

My invention also relates to detail constructions and combinations of parts hereinafter more particularly pointed out in the specification.

In the drawings, Figure 1 is an end view of my device; Fig. 2 is a side elevation of the same; Fig. 3 is an end view of my invention viewed from the opposite side from that disclosed in Fig. 1; Fig. 4 is a side elevation of my device viewed from the opposite side from that disclosed in Fig. 2; Fig. 5 is a plan view showing the main features of my invention; Fig. 6 is a top view of a balance hopper associated with a chute adapted to be arranged above the weighing trough and to control the flow thereto; Fig. 7 is a side elevation of the same device designed to be illustrated in Fig. 6; Fig. 8 is a detail view of a stop for the scale beam, and Fig. 9 is a detail view of certain driving connections between the disk wheel and the meter. Fig. 10 is a side elevation of a controlling means to regulate the flow of grain from the hopper to the scale with parts of the hopper broken away to show interiorly located parts.

Referring to the drawings, 2 is a supporting frame; 3 is a bracket adapted to be connected with said frame and extending outwardly therefrom provides a journal support for the outer end of knife edge 3′, the other end of said knife edge being supported in connection with frame piece 4, which latter is bolted onto frame 2.

5 is a scale beam divided as shown in Fig. 5 and is centered or pivoted upon knife edge 3′ and is provided with notched portions 5′.

6 is a bar secured by socket and bolt connection with scale beam 5 and is provided with counterbalancing weights 7 adapted to be fixed in any desired position by means of set screws 8. While three counterbalancing weights have been shown, one may be used, if desired.

9 is a pin fixed near the outer end of bar 6 and serves as a means of attaching additional balancing weights, as will hereinafter be explained. A dash pot 10 is connected with the outer end of bar 6, the same being of the well known construction, and it is deemed unnecessary to explain its structure in detail. The forward end of scale beam 5 is adapted to support the divided frame 11 within notches 5′, within which there is mounted the spout 12. The spout 12 is disposed angularly with relation to a vertical plane for the purpose of inducing the flow of grain or other material therethrough and may be adjusted at any desired angle to suit conditions of use. A paddle wheel is designed to be supported in frame 11 upon spindle 14. This paddle wheel is composed of a central body portion 15 suitably secured to spindle 14, also a series of paddles 16 disposed at graduated intervals about central body portion 15 and pivoted as at 17 to permit them to freely move under circumstances hereinafter explained. Each paddle bears normally against an offset on extensions 17′ of body portion 15 so that when it is at work and receiving the thrust of grain passing through trough 12, they will stand in the position shown in Figs. 1 and 3 in bearing relation with said offsets. The outer end portions of each paddle wheel are extended into a fork or forks as 18 to present a reasonably narrow bearing surface to the grain passing through said trough. Spindle 14 is adapted to turn freely within its support and carries at one end the disk 19, the outer face of which is provided with a reasonably smooth and absolutely true bearing surface.

In the structural combination adapted for practical use, all the parts comprising frame 11, trough 12, disk 19 and the paddle wheel, are adapted to be normally counterbalanced by counterbalancing weights 7.

As a counterweight or resistance to the depression of hanger frame 11, which supports the trough 12, caused by grain passing through said trough, I have provided the oscillating arm comprising parts *a* and *b*, the latter provided with the elongated slot *c* to provide for centering upon pin *d*, upon which latter pin it is designed to turn as a pivot. To facilitate the positioning of the centering pin *d* at either end of slot *c* I provide the wedged block *f*, this positioning of the centering pin being essential to accommodate the scale beam's being turned in reverse direction. Normally, centering pin *d* is fixed about one inch from a vertical line through the center of knife edge 3'.

*g* is a short arm likewise centered upon centering pin *d* and is adapted to be connected with part *b* in an adjustable relation by means of the link or plate *h*. For the purpose of providing adjustment of the weight arm with realtion to the scale beam, I have provided the connecting rod *i* which is secured at its lower end to the pivot lug *k*, its upper end having a screw connection with pivot screw socket *m*. By means of the adjusting facilities provided between the weight arm and the short arm *g* and between said short arm *g* and the scale beam, I am able to provide a universal adjusting means that will compensate for the minutest variations of weight.

In practice, it is designed, as heretofore stated, that grain shall pass through trough 12 in a continuous stream and in so doing the grain contacting with the fingers 18 of the paddles will cause the latter to be revolved and with them disk 19. The paddles are pivoted for the purpose of their yielding to objects, as cobs, that may pass through the trough, which might serve if the paddles were fixed to wedge and stop the wheel.

It is the design of the inventor to convey speed or movement from disk 19 to a meter to be measured by the latter. To this end I have provided the disk 20 supported at right angles to disk 19 and in intended bearing relation with the outer surface thereof at all times during the vertical movement of the disk in connection with the spout under all variations of depression of the latter on account of different weights of grain being passed therethrough. Disk 20 is supported upon spindle 21 and the latter in frame 22 formed with outwardly extending parts to engage said spindle and there may be provided in said frame suitable anti-friction bearings to lessen the wear and prevent impairment of movement of the disk. The frame 22 is likewise supported upon bar 23 which at its lower end is secured to rock bar 24 which has its outer end turned at right angles with its central body, said end portions being perforated and adapted to be journaled upon pin 25. Pin 25 is supported and held by cotter pins in rectangular frame 26, which latter frame is secured to the upper portion or arm 27 of standard 28, said standard being supported in arm 29, the latter secured to frame 2.

30 is a brace bar connecting frame 26 with arm 27 of standard 28.

In the operation of the device it is necessary that disk 20 shall be adjustable relative to disk 19 for the reason that the frame 11 supporting the paddles, trough and the disk, is slightly tilted from a vertical line on account of the necessity of its being supported at its lower end against lateral movement. The means employed to support said frame comprises the arm 31 pivoted to frame 2 as at 32 and to the frame 11 as at 33. Obviously, as frame 11 is moved up or down, the disk 19 will tilt slightly with frame 11. To follow this movement, disk 20 is yieldingly held against said disk 19 through and by means of spring 34 bearing against upright frame piece 23 and the other end thereof connected with screw 35 suitably supported in the upper portion of arm 27'. The tension of the spring on upright bar 23 may be increased or diminished at will through and by means of screw 35. By this means the disk 20 is always held in contact with the surface of disk 19. The movement imparted to disk 20 through disk 19 is transmitted through spindle 21 to the spiral 36 upon the lower end of said spindle and the spiral is supported relative to toothed wheel 37 in a relation that will cause said wheel to be turned. To the rear face of toothed wheel 37 there is fixed a cog wheel 38 which latter normally meshes with gear wheel 39 on meter shaft 40 of meter 41, which said meter is permanently supported from standard 28. Disk 37 is pivoted upon a centering pin 42 secured on arm 43 which latter arm is pivoted to pin 44 fixed to the outer wall of the meter 41.

45 is a contact arm having fixed connection with pivot arm 43 and extending angularly therefrom. Upward thrust on arm 45 will cause gear wheel 38 fixed on disk 37 to be disengaged from cog wheel 39 on the meter shaft. This separable relation of the gear wheels is provided to cut the meter out from operation when grain ceases to flow through trough 12 but during a period when the paddle wheel in said trough is acting under the momentum caused by the flow of grain therethrough.

The disconnection of cog wheels 38 and 39 is accomplished through arm 46 connected with frame 11, which supports the trough and the paddle wheel, engaging the outer end of arm 45 when the scale beam passes to balanced position when relieved of the weight of grain flowing through trough 12. This means for cutting off the movement of disks 19 and 20 from the meter is merely provided to insure accuracy in weighing.

Referring to Fig. 8, the plate 48 provided with stop 49 thereon, is adapted to be suitably supported above the scale beam in its relation as shown in connection with Fig. 2, to form a stop for the scale beam in the upper movement of its outer end.

It is very essential to the correct operation of my weighing device that the flow of grain to trough 12 shall be controlled and to this end I have provided in connection with chute 50, control valves as 51, which valves are provided with open central portions adapted to permit a limited flow of grain therethrough. The flow of different grains is regulated by the size of the openings in the valves. In the operation of weighing, the paddles being very sensitively supported, will turn by the slightest flow, and as a trifling flow through trough 12 will not affect the normal balance of the scale beam, I have provided means for cutting out what is called dribble of grain, which occurs at the conclusion of the flow from bins or other containers. To accomplish the cutting out of the dribble, I have provided the balance trough 52 which is pivoted upon pin 53 secured to fixed discharge spout 54. The balance bar 55 is provided, adapted to carry a weight as 56. Normally, the trough would be positioned as shown in solid lines in Fig. 7. Balance trough 52 is adapted to be held in position to catch the dribble until there is sufficient accumulation to provide sufficient weight to depress trough 12 and to insure its being held until there is sufficient accumulation, I have provided an adjustable latch comprising bar 60 pivoted to the body of chute 50, weight 61 on the outer end thereof, notched bracket 62 serving as a stop for bar 60, dog 63 pivoted to bar 60 and held under limits of stop pin 64 by spring 65 or forward projection in line for contact and engagement of the pin 66 fixed on trough 52. Trough 52 in its normal position substantially closes discharge spout 54. This discharge spout is connected with a hopper 67, said hopper having an overflow spout 68. When hopper 67 is filled to certain limits, it will overflow through spout 68, discharging toward the outer end of trough 52 until the latter is overbalanced, thus relieving the closure of the main discharge spout 54 permitting the flow thereafter from said discharge spout.

In the operation of the device, the proper slide or control valve as 51 having been provided to establish a uniform flow of any particular character of grain to trough 12, grain passing through said trough will cause it to be depressed and likewise to operate the paddle wheel therein, thus imparting movement to disk 19. Disk 20 in contact with disk 19 will travel with the movement of disk 19 at a speed proportionate with its bearing distance from the axial center of said disk 19. The movement of disk 20 is transmitted through spindle 21, spiral 36, toothed disk 37, gear 38 and gear 39 to the meter shaft 40, thereby imparting movement to the latter for the purpose of measuring or weighing the grain. Means may be provided on the meter shaft by means of which the operator may turn said shaft to adjust the latter.

The theory of operation of the structure disclosed is that the speed of the flow through the trough will be imparted to the paddle wheel and from thence to disk 19, and that such speed will be imparted to disk 20 and from thence to the meter, and that variations in weight of the grain passing through the spout will cause variations in the depression of frame 11, consequently in disk 19, which will result in a varying contact of disk 20 between the neutral axis of disk 19 and its periphery, consequently with the increase of weight of grain passing through the trough, there will be an increased depression of the scale beam, which will result in the contact of disk 20 correspondingly a greater distance from the neutral axis of the disk 19, hence disk 20 will be caused to travel a greater arc or circle upon said disk 19. Conversely, as the load in trough 12 decreases, disk 20 will shift toward the neutral center and its speed will diminish with the lessening arc or circle necessary to be traveled in the revolution of disk 19.

All variations of speed in disk 20 occasioned by variations in the weight of grain passing through trough 12, will be measured proportionately by the meter and hence having first accomplished a proper graduation of the meter to correspond as a correlative measuring factor, correct measurement or weight may be attained.

What I claim is:

1. In a scale, in combination, a supporting frame, a scale beam thereon, a trough associated with one end of the scale beam, counterbalancing means at the other end thereof, counterweight means connected with the scale beam, the force of said counterweight being adapted to vary with the displacement, a disk upon the trough means for turning the disk driven by the flow of material through the trough, a tally box, a member stationary upon the frame driven from said disk and connected with the tally box.

2. In a scale, in combination, a supporting frame, a scale beam, a trough suspended from one end of the scale beam disposed at an angle to a horizontal plane, counterbalancing means at the other end of the beam, counterweight means connected with the scale beam, the force of said counterweight being adapted to vary with the displacement, a paddle wheel supported in connection with the trough and driven by the flow of grain therethrough, a disk driven from the paddle wheel, a tally box, a driven part mounted for rotation upon the supporting frame having bearing contact with the disk, and a driving connection with the tally box.

3. In a scale, in combination, a supporting frame, a scale beam thereon, a trough suspended from one end of the beam and disposed at an angle to a horizontal plane, counterbalancing means at the other end of the beam, counterweight means connected with the scale beam, the force of said counterweight being adapted to vary with the displacement, a paddle wheel supported in connection with the trough, and driven by the flow of grain therethrough, a disk driven from the paddle wheel, a tally box, a driven part stationary upon the supporting frame having a yielding bearing contact with the disk, and a driving connection with the tally box.

4. In a scale, in combination, a supporting frame, a scale beam, a frame supporting a trough connected with one end of the scale beam, counterbalancing means on the other end of the scale beam, counterweight means connected with the beam, the force of said counterweight being adapted to vary with the displacement, a disk connected with the trough and driven by the flow of material therethrough, a tally box, a driven part stationary upon the supporting frame having a bearing contact with the disk, and means connecting said driven part with the tally box adapted to operate the latter.

5. In a scale, in combination, a supporting frame, a scale beam, a frame suspended from one end of the scale beam, a trough supported in said frame, counterbalancing means on the other end of the scale beam, counterweight means connected with the scale beam, the force of said counterweight being adapted to vary with the displacement, a disk connected with the trough and driven by the flow of material therethrough, a tally box, a driven part stationary upon the supporting frame having a bearing contact with the face of the disk, and means intermittently connecting said driven part with the tally box, whereby the latter is driven from the former or may be disconnected therefrom.

6. In a scale, in combination, a supporting frame, a scale beam, a frame supported upon one end of the scale beam, a trough supported at an angle in said frame, counterbalancing means on the other end of the scale beam, counterweight means connected with the scale beam, the force of said counterweight being adapted to vary with the displacement, a disk connected with the trough and driven by the flow of material through the latter, a tally box, a driven part having a bearing contact with the disk and stationary upon the supporting frame, means intermittently connecting the driven part with the tally box, whereby the latter is driven from the former or may be disconnected therefrom, and means for accomplishing such disconnection.

7. In a scale, in combination, a supporting frame, a scale beam, a frame suspended from one end of the scale beam, an inclined trough in said frame, counterbalancing means at the other end of the scale beam, counterweight means connected with the scale beam, the force of said counterweight being adapted to vary with the displacement, a paddle wheel supported in connection with the trough in a relation to be freely turned by the passage of material therethrough comprising a central frame portion and radially disposed paddles, a vertically disposed disk driven from the paddle wheel and supported for vertical movement with the trough, a tally box, a horizontally disposed disk stationary upon the supporting frame and having a bearing contact with the vertically disposed disk, and means connecting the horizontally disposed disk with the tally box, whereby the movement of the former will be transmitted to the latter.

8. In a scale, in combination, a supporting frame, a scale beam, a frame suspended from one end of the scale beam, a trough supported in said frame, counterbalancing means at the other end of the scale beam, counterweight means connected with the scale beam, the force of said counterweight being adapted to vary with the displacement, a paddle wheel connected with the trough support in a relation to be freely turned by the passage of material through said trough comprising a central frame portion and radially disposed paddles pivoted upon said frame, a vertically disposed disk driven from the paddle wheel and vertically movable with the trough, a tally box, a horizontally disposed disk supported in a stationary position upon the supporting frame and having a bearing contact with the face of the vertically disposed disk, and means connecting the horizontally disposed disk with the tally box, whereby the movement of the former will be transmitted to the latter.

9. In a scale, in combination, a supporting frame, a scale beam, a trough suspended at one end of the scale beam, counterbalancing means at the other end of the scale beam, counterweight means connected with the scale beam the force of said counterweight being adapted to vary with the displacement, a paddle wheel supported in connection with the trough in a relation to be freely turned by the passage of material through the latter comprising a central frame portion, radially disposed paddles, a vertically disposed disk driven from the paddle wheel and vertically movable with the trough, a tally box, a horizontally disposed disk suitably supported in a permanent position and having yielding bearing contact with the vertically disposed disk and means connecting the horizontally disposed disk with the tally box comprising a spindle, a worm spiral upon the spindle, a toothed disk, a gear wheel thereon and a gear wheel upon the meter axle, whereby the movement of the horizontally disposed disk will be transmitted to the tally box.

10. In a scale, in combination, a supporting frame, a scale beam thereon, a trough suspended from one end of the scale beam, counterbalancing means at the other end of the scale beam, counterweight means connected with the scale beam, the force of said counterweight being adapted to vary with the displacement, a paddle wheel supported in connection with a trough in a relation to be freely turned by the passage of material therethrough comprising a central frame portion and radially disposed paddles pivoted upon said frame, a vertically disposed disk driven from the paddle wheel and vertically movable with the trough, a tally box, a horizontally disposed disk stationary upon the supporting frame having a yielding bearing contact with the vertically disposed disk and suitable driving connection between the horizontally disposed disk and the tally box, whereby the movement of the former will be transmitted to the latter.

11. In a scale, in combination, a supporting frame, a scale beam, a frame suspended from one end of the scale beam, a trough connected with said frame, counterbalancing means at the other end of the scale beam, counterweight means connected with the scale beam, the force of said counterweight being adapted to vary with the displacement, means within the trough adapted to be actuated by the flow of grain therethrough, a disk driven by said means, and movable with said trough, a tally box, and means stationary upon the supporting frame driven by said disk, and connection therefrom with the tally box, whereby the movement of the former will be imparted to the latter.

12. In a scale, in combination, a supporting frame, a scale beam, a trough suspended from one end of the scale beam, counterbalancing means at the other end of the scale beam, counterweight means connected with the scale beam, the force of said counterweight being adapted to vary with the displacement, means within the trough adapted to be actuated by the flow of grain therethrough, a disk driven by said means and movable with said trough, a tally box, a member stationary upon the supporting frame driven from said disk, and means for supporting said driven part in yielding contact with the disk.

13. In a scale, in combination, a supporting frame, a scale beam, a trough supported from one end of the scale beam, counterbalancing means at the other end thereof, counterweight means connected with the scale beam, the force of said counterweight being adapted to vary with the displacement, means within the trough adapted to be actuated by the flow of grain therethrough, a disk driven by said means and movable with said trough, a tally box, a driven part stationary upon the supporting frame connected with the tally box and driven from said disk, means for supporting said driven part in yielding contact with the disk, and means actuated by the movement of the trough to disconnect the driven part from the tally box.

14. In a scale, in combination, a supporting frame, a scale beam, a trough suspended from one end of the scale beam, counterbalancing means at the other end thereof, counterweight means, its force applied adapted to vary with the displacement, means within the trough adapted to be actuated by the flow of grain therethrough, a disk driven by said means and movable with said trough, a tally box, a member driven from said disk stationary upon the supporting frame and connected with the tally box, means actuated by the movement of the trough to disconnect the driven part from its connection with the tally box, and means for holding the trough against lateral movement.

15. In a scale, in combination, a supporting frame, a scale beam thereon, a trough connected with one end of the scale beam, counterbalancing means at the other end thereof, counterweight means, the force of which is adapted to vary with the displacement, means for controlling the flow of grain to the trough comprising a chute and valves having openings of varying size, a hopper associated with said chute, a balance trough therein, a supplemental hopper normally discharging into said trough at substantially its fulcrum point and having an auxiliary outlet removed from its main center of discharge adapted by accumulation within the hopper to discharge into said balance trough at a point considerably removed from its fulcrum point.

In testimony whereof I have affixed my signature in presence of two witnesses.

FRANK S. HEBDEN.

Witnesses:
MARY E. COMEGYS,
W. V. TEFFT.

---

Copies of this patent may be obtained for five cents each, by addressing the "Commissioner of Patents, Washington, D. C."